United States Patent
Stringer-Calvert et al.

(10) Patent No.: US 7,403,980 B2
(45) Date of Patent: Jul. 22, 2008

(54) METHODS AND APPARATUS FOR SCALABLE, DISTRIBUTED MANAGEMENT OF VIRTUAL PRIVATE NETWORKS

(75) Inventors: David W. J. Stringer-Calvert, Sunnyvale, CA (US); Steven Mark Dawson, Menlo Park, CA (US); Patrick D. Lincoln, Woodside, CA (US)

(73) Assignee: SRI International, Menlo Park, CA (US)

( * ) Notice: Subject to any disclaimer, the term of this patent is extended or adjusted under 35 U.S.C. 154(b) by 685 days.

(21) Appl. No.: 09/844,693

(22) Filed: Apr. 26, 2001

(65) Prior Publication Data

US 2002/0055989 A1    May 9, 2002

Related U.S. Application Data

(60) Provisional application No. 60/247,184, filed on Nov. 9, 2000, provisional application No. 60/247,488, filed on Nov. 8, 2000.

(51) Int. Cl.
*G06F 15/173* (2006.01)
(52) U.S. Cl. .............. 709/220; 709/221; 709/222; 709/223; 709/224; 709/239; 709/249; 709/252
(58) Field of Classification Search ......... 709/220–224, 709/239, 249, 252
See application file for complete search history.

(56) References Cited

U.S. PATENT DOCUMENTS

| | | | |
|---|---|---|---|
| 5,666,415 A | 9/1997 | Kaufman | |
| 5,729,608 A | 3/1998 | Janson et al. | |
| 6,055,429 A | 4/2000 | Lynch | |
| 6,079,020 A * | 6/2000 | Liu | 713/201 |
| 6,092,200 A * | 7/2000 | Muniyappa et al. | 713/201 |
| 6,195,751 B1 | 2/2001 | Caronni et al. | |
| 6,226,748 B1 * | 5/2001 | Bots et al. | 713/201 |
| 6,263,437 B1 | 7/2001 | Liao et al. | |
| 6,304,556 B1 | 10/2001 | Haas | |
| 6,353,898 B1 * | 3/2002 | Wipfel et al. | 714/48 |
| 6,456,599 B1 | 9/2002 | Elliott | |
| 6,493,349 B1 * | 12/2002 | Casey | 370/409 |
| 6,516,417 B1 * | 2/2003 | Pegrum et al. | 713/201 |
| 6,662,221 B1 * | 12/2003 | Gonda et al. | 709/223 |
| 6,671,724 B1 * | 12/2003 | Pandya et al. | 709/226 |
| 6,711,400 B1 | 3/2004 | Aura | |

(Continued)

*Primary Examiner*—Niketa I Patel

(57) ABSTRACT

A groupware management system for collaborative groups is disclosed that is scalable to support large, dynamic, multiple, and other virtual VPNs. The system may introduce a graph (or hierarchical) structure to the VPN, providing multiple master nodes controlling membership in subsets of the collaborative group. Use of multiple master nodes in a graph-structured (or hierarchical) network topology often relaxes the need for a single, centralized, globally consistent view of VPN group membership, and enables distribution of the management burden among multiple master nodes. Membership in the VPN may be changed dynamically by the second master node for the member nodes of the second subset, without requiring the first master node to dynamically update its group membership records to reflect the change and in many cases without even having to notify the first master node (and vice versa), for example. In further embodiments, the use of multiple master nodes may increase the reliability and efficiency of VPNs, such as by enabling load balancing of master node tasks. Fail-over mechanisms may also be used to transparently re-route management tasks to an alternate master node especially in the case of failure of the current master node serving a given member node.

30 Claims, 6 Drawing Sheets

U.S. PATENT DOCUMENTS 6,711,409 B1    3/2004   Zavgren et al.
6,751,220 B1 *  6/2004   Li ............................... 370/390
6,775,772 B1    8/2004   Binding et al.
6,788,681 B1 *  9/2004   Hurren et al. ................ 370/389
6,889,248 B1 *  5/2005   Scheer ........................ 709/209

* cited by examiner

METHODS AND APPARATUS FOR SCALABLE, DISTRIBUTED MANAGEMENT OF VIRTUAL PRIVATE NETWORKS

This application claims the benefit of U.S. provisional applications Nos. 60/247,184 filed Nov. 9, 2000 and 60/247,488 filed Nov. 8, 2000 both incorporated herein by reference in their entirety.

Reference to Government Funding

This invention was made with Government support under Contract Number N66001-00-C-8001 awarded by Space and Naval Warfare Systems Center. The Government has certain rights in this invention.

FIELD OF THE INVENTION

The field of the invention is secure groupware management.

BACKGROUND OF THE INVENTION

A virtual private network (VPN) is an overlay network that provides secure communication channels through an underlying (usually public) network infrastructure (such as the Internet), as a relatively inexpensive alternative to private secure lines. Communications among the members of a VPN are typically automatically encrypted using secure keys known to the members of the group, as a means of achieving the desired privacy for the members.

The management of encrypted group communications entails burdens such as the establishment, maintenance, and distribution of encryption keys. For example, in some systems, all members of a particular VPN may utilize a single global encryption key for private communication with other group members. In such systems, removing a member from the VPN typically requires the group manager to revoke the old key and to distribute a new group key to all members, so that the removed member can no longer decrypt private group communications. In addition, a VPN application may require individual members or various combinations of members to use different keys for particular interactions. In such an application there is an even greater key management burden. Generally, as the number of members increases, and as membership changes dynamically with greater frequency, the complexity of the management burden increases. Thus, very large and/or dynamic VPNs can cause overloading of the group manager, that represents a potential single point-of-failure, and consequently traditional VPNs may be considered relatively non-scalable. As large, distributed enterprises and organizations in our society rely increasingly on secure and private electronic communication and interaction, the need for highly scalable VPN architecture grows ever more pronounced.

FIG. 1 is a schematic of a prior art system where VPN 110 is managed by master node 120. Prior art system VPN 110 is a typical simple-VPN. Communications among member nodes 130 a-c in VPN 110 are automatically encrypted using keys known to the appropriate group members, such that even though the communications are typically transmitted via the ordinary underlying public network infrastructure (e.g., the Internet), a "virtual" private channel may be effectively provided for group communications.

In a prior art system such as shown in FIG. 1, master node 120 is responsible for managing VPN 110 group membership by performing the functions associated with entry or exit to or from a group, such as authentication, as well as distribution and maintenance of the secure encryption keys for private communication. Master node 120 may simply be a service-providing node, or may be a member of the group who also serves as a group leader; see, e.g., the Enclaves™ system created by the assignee of the present invention and described in L. Gong, "Enclaves: Enabling Secure Collaboration Over the Internet," published in Proceedings of the $6^{th}$ USENIX Security Symposium, pp. 149-159, San Jose, CA (July 1996). In some typical VPN systems, the master node makes sure that all member nodes have up-to-date knowledge of the group encryption key and the identity of all current VPN group members, so that client communication software and/or hardware for each member node 130 can automatically encrypt communications and interactions addressed to other group members using appropriate encryption keys. Thus, if a group member leaves or is removed from the VPN group, master node 120 must notify all active group members of the membership change; must revoke the old group encryption key and generate a new one; and must provide the new key to all current members. Similarly, if a new node joins the group as a member, master node 120 usually notifies all active group members of the membership change. As noted previously in the "Background" section, this imposes a management burden on master node 120, resulting in scalability problems and limitations for large, dynamic, and other VPNs.

SUMMARY OF THE INVENTION

The present invention provides a groupware management system that is scalable to include large, dynamic, and even multiple virtual VPNs. Scalability may be improved by introducing a graph (or hierarchical) structure to the VPN, thereby providing multiple master nodes controlling membership to the collaborative group.

In an aspect of the subject matter, multiple master nodes, each controlling a subset of the members, need only communicate with the subset of the member nodes for which it is directly responsible. Therefore, the communication and management burden on any given master node is preferably reduced relative to what it would have been in a single-master implementation.

A distributed approach tends to lead to a collaborative group that is relatively more scalable in terms of number of member nodes, dynamic nature, the number of separate VPNs that may be managed by a given master node, and other variables.

Some embodiments of the present invention include a group management system for use with a communications network. The group management system may have multiple interconnected nodes communicating with each other via the network as members of a VPN. A first master node preferably controls membership in the VPN of a first subset of the members, and a second master node, different from the first master node, preferably controls membership in the VPN of a second subset of the member nodes. Similarly, additional master nodes may each control VPN membership for an associated subset of member nodes. Use of multiple master nodes in a graph-structured (or hierarchical) manner relaxes the need for a single, centralized, globally consistent view of the group membership of the VPN. Not requiring a globally consistent view of the group membership generally enables distribution of the management burden among multiple master nodes. Membership in the VPN may be changed dynamically by the second master node for the member nodes of the second subset, without requiring the first master node to dynamically update its group membership records to reflect the change and in many cases without even having to notify the first master node (and vice versa), for example.

In an embodiment, the use of multiple master nodes communicating with each other may increase the reliability and efficiency of VPNs, such as by enabling load balancing of master node tasks. Fail-over mechanisms may also be used to transparently re-route management tasks to an alternate master node in the case of failure of the current master node serving a given member node.

In another embodiment, master nodes may provide remote installation of software communication mechanisms for a new member node. Efficiency may be further increased when the master nodes operate as components of an edge-based content delivery server network. Due to the relative proximity of edge network server nodes to member nodes, the use of an edge network usually provides more reliable connectivity between master nodes and member nodes, at higher speed, with lower latency and jitter, and generally allows for a broader geographic distribution of the master nodes.

Some embodiments may employ a viral construction of VPNs in a peer-to-peer network, and/or graph structured VPN topologies, including for example, multiple paths within the virtual overlay network between particular master nodes and member nodes. Such topologies may offer intrusion detection, improved fault tolerance, and other beneficial capabilities.

DETAILED DESCRIPTION

Network Definitions

A network "node" may be any type of device or collection of devices capable of processing instructions including (but not limited to) a cellular phone, a PDA, an intelligent household appliance, a general-purpose computer, a network server, a multi-processor cluster of computers, and a computer network such as a LAN. Network nodes are considered "interconnected" if there is a path for communication between them including a potential path, regardless of whether that path is direct.

A "simple-VPN" may be viewed as a collection of nodes that are interconnected in a secure manner. A simple-VPN is typically a communications group - that is, a simple-VPN generally enables every member node to transparently send private communications to other member nodes. A simple-VPN may employ a single encryption domain, i.e. a single encryption key is utilized for communications among all member nodes. The key may change over time, advantageously providing only one key is considered active for group communications within the VPN at any time. Simple-VPNs may consist of a master node and member nodes. The master node may be responsible for key management and group membership. A simple-VPN master node may also be a member node of the simple-VPN, and further, a single node may be a master node for more than one simple-VPN.

A "super-VPN", as described herein, is an extension of the simple-VPN in which there may be standard simple-VPN member nodes, and further member nodes. In certain aspects, each of the further member nodes may be the master node of one or more other simple-VPN or (recursively) a master node of one or more other super-VPN. A super-VPN can thus be represented by a graph structure of simple-VPNs, or in a simple case, a hierarchy of simple-VPNs. A super-VPN generally comprises a single communication group—that is, every member node of the super-VPN may transparently send private communications to other member nodes. The super-VPN also may comprise one or more encryption domains. In the case of multiple encryption domains within a single super-VPN, inter-domain encryption translation becomes one of the group management tasks to be performed, preferably by the master nodes.

Distributed Management in a Super-VPN, with Dynamic Group Membership

Figure 1:
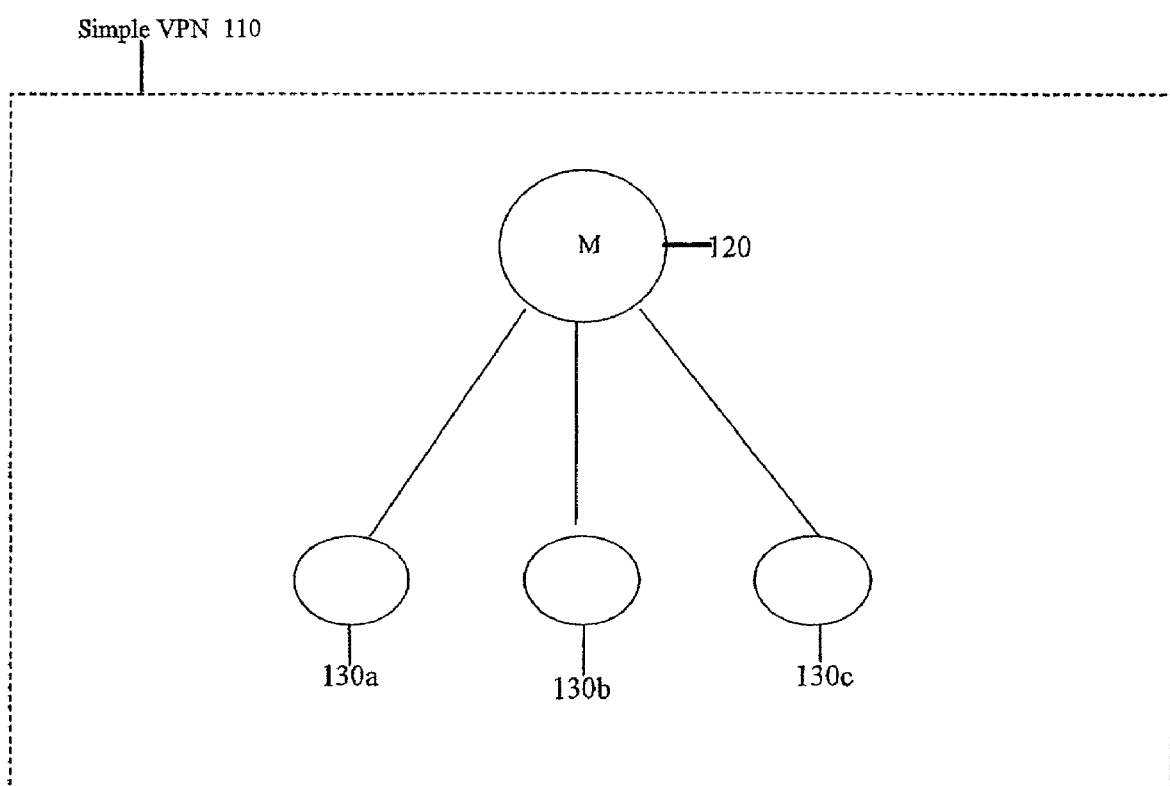
FIG. 1 schematically represents a prior art group management system.

The prior art described with reference to FIG. 1 corresponds to a simple-VPN in our terminology, and consists of a single encryption domain, or a collection of encryption domains, that utilize a single master node to mediate and manage all group communications.

A more scalable super-VPN architecture, especially suitable for highly dynamic VPN groups, is employed by a preferred embodiment of the present invention. This architecture and methodology may provide the same secure group communications functionality as the traditional VPN with lower overall management overhead, by distributing responsibility for managing VPN membership among at least two or more master nodes, each of which is assigned responsibility for a subset of the member nodes.

Figure 2:
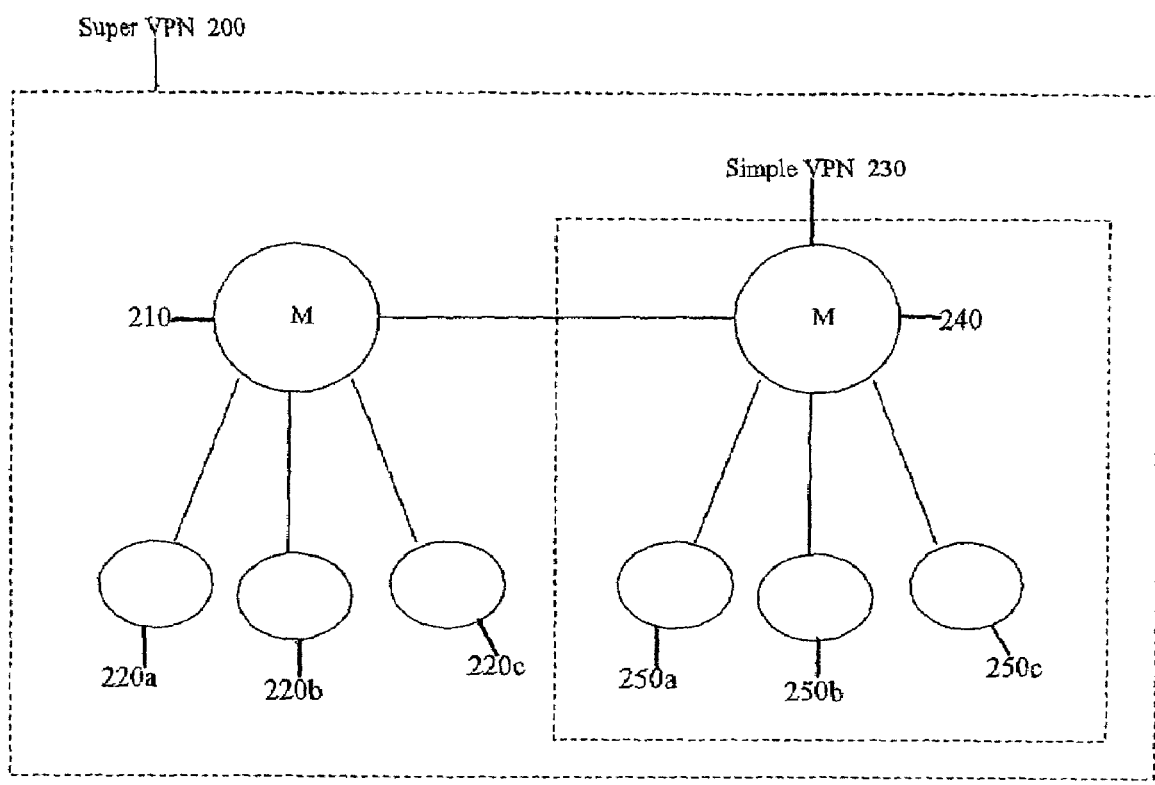
FIG. 2 schematically represents a VPN management system having two or more master nodes.

FIG. 2 depicts a super-VPN 200, containing the master node 240 of the simple-VPN 230 as a member. This creates a hierarchical structure in super-VPN 200 whereby the management burden for controlling member nodes 250a-c is delegated to master node 240, as each master node manages and maintains its own membership list. Thus, the first master node 210 manages a member list including nodes 220a-c and the second master node 240 manages a member list including nodes 250a-c.

Some of the advantages of the super-VPN may be better appreciated if one considers the procedures typically entailed in joining or leaving a VPN. In a traditional VPN, as described above, all communications involving member nodes joining or leaving the VPN are typically directed to the single, overworked, master node. In a super-VPN, these communications may instead be distributed over a plurality of master nodes. It is further contemplated that communications may be load-balanced among the master nodes using standard techniques of the network load balancing art.

Figure 3:
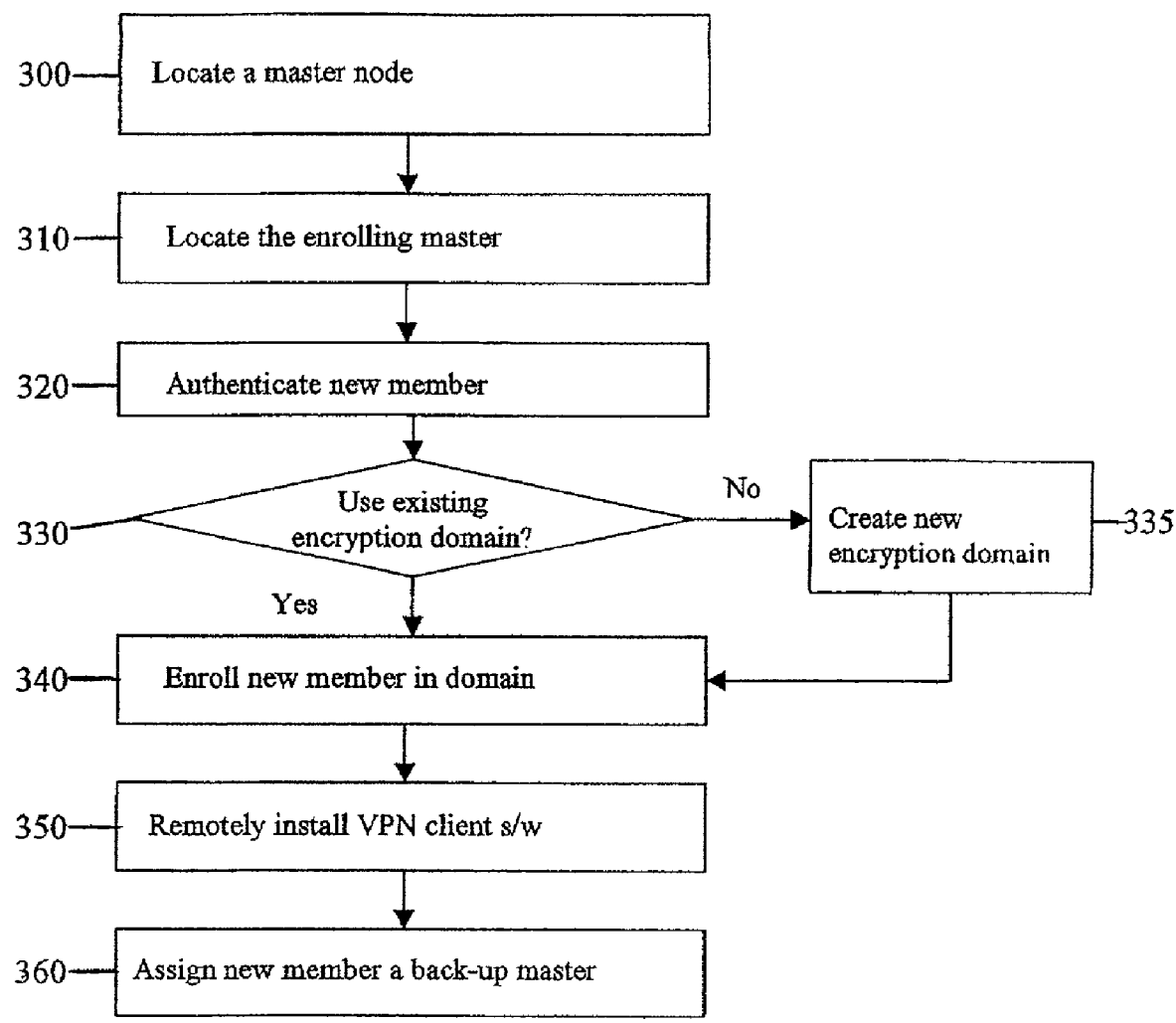
FIG. 3 is a flow diagram illustrating a management method for joining a multi-master VPN.

FIG. 3 depicts a process for joining the super-VPN in one embodiment of the present invention. At step 300, a node wishing to join a super-VPN locates a master node of the system. This may be performed using network resource discovery methods such as described in the present assignee's co-pending patent application Ser. No. PCT/US00/29290, "Resource Distribution and Addressing" (the "NEVRLATE" methods), or by any other suitable resource location method. The overall system of network master nodes may, in some embodiments, service and support more than one VPN communication group, and so in principle the first located master node may not necessarily currently manage membership for the particular VPN that the prospective member node wishes to join. Therefore, in some embodiments and as shown in FIG. 3, at step 310 the first master node locates a second master node that is currently responsible and accepting enrollment for the requested super-VPN. The search for an appropriate second master node may similarly be accomplished using NEVRLATE or by any other suitable resource location method, just as for location of the first master node. In other embodiments, the initial query used at step 300 to locate a master node includes an identifier of the requested super-VPN, such that a currently participating master node is returned to the prospective member node making the query. In such embodiments step 310 is unnecessary and the flow of control proceeds directly from step 300 to step 320.

Once the appropriate managing master node is located, at step 320 the master node authenticates the prospective member node. Assuming authentication is successful, at step 330 the master node preferably assesses whether to add the prospective member node to an existing encryption domain, or whether it would be better to create a new encryption domain for the new member. For example, as will be discussed further below in connection with FIG. 4, practitioners may design the master node to assess and optimize the tradeoff between the additional work required to translate information flowing among additional encryption domains, versus the potential work associated with re-keying all members of a given encryption domain each time any current member of that domain leaves. Depending on the outcome of that assessment, the master node may add the new member to an existing encryption domain at step 340, or initiate creation of a new encryption domain at step 335. The master node may then add the new member node to said new domain at step 340. In other embodiments, assessment element step 330 may be omitted and the master node may simply proceed directly from authentication at step 320 to adding the new member node as a client at step 340 within one of the encryption domains of the super-VPN currently managed by the master node.

In some embodiments, at step 350 the master node may provide remote online installation of software for VPN group communication mechanisms (encryption, etc.) for the new member node, obviating or reducing the need for local manual installation of such mechanisms by end-users. For example, the "Enclaves" technology referenced earlier herein includes relatively lightweight software modules implementing such mechanisms, or practitioners may readily create their own. In accordance with the teachings herein, a super-VPN master node may remotely install such software on behalf of its new member client nodes.

Step 360, assigning a backup-master node, is employed in some embodiments as discussed below under the heading "Failure Tolerance in Super-VPNs".

Figure 4:
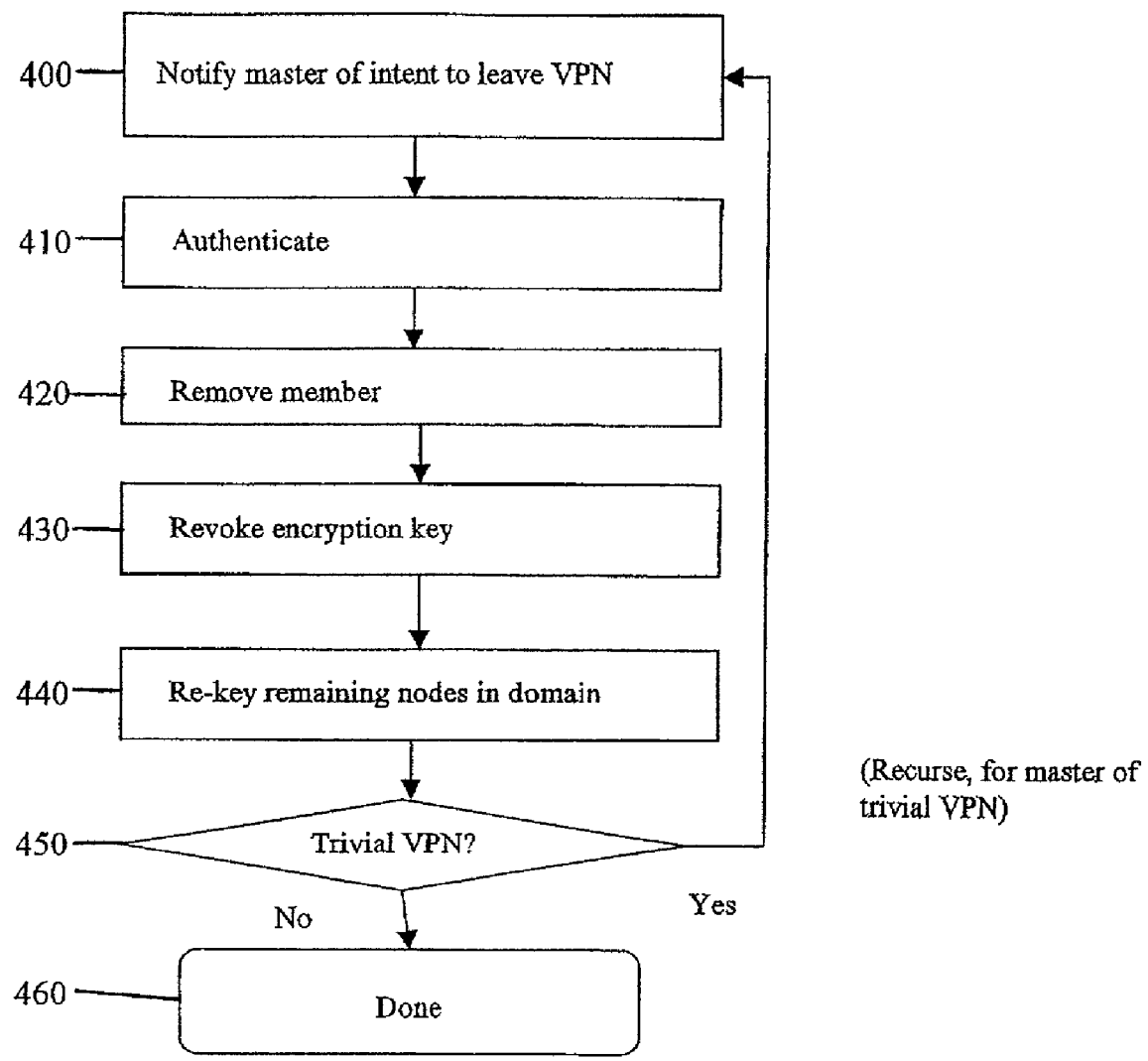
FIG. 4 is a flow diagram illustrating a management method for leaving a multi-master VPN.

FIG. 4 describes a process of leaving a super-VPN. At step 400, the member node intending to leave the super-VPN transmits notification of such intent to its assigned master node. At step 410, the notification is authenticated as genuine to avoid the potential for unauthorized third-party nodes to remove illicitly a member node from a super-VPN. Once the notification has been authenticated, at step 420 the member node is removed from group communication. At step 430 the encryption key currently in use by the former member's encryption domain is revoked, and at step 440 the remaining member nodes in that encryption domain are given new encryption keys for further group communications.

The re-keying process just described at 430-440 presents a tradeoff against performing decryption and re-encryption in order to transmit information between encryption domains. In other words, minimizing the number of different encryption domains for a given collection of VPN member nodes (i.e. increasing the number of member nodes allocated to each encryption domain) generally reduces workload on the master node(s) to perform inter-domain encryption translation, but may increase the amount of re-keying that is performed when a member node leaves. Conversely, increasing the number of different encryption domains for a given collection of VPN member nodes (i.e. decreasing the number of member nodes allocated to each encryption domain) may increase the workload of the master node(s) to perform encryption translation for inter-domain communications, but may decrease the amount of re-keying that is performed when a member node leaves.

As mentioned previously, in preferred embodiments the master node may gather statistics on the dynamic nature of each simple-VPN encryption domain, and dynamically adjust the size of encryption domains by utilizing decision making techniques (such as "MCDA"—Multi Criteria Decision Analysis) to minimize or reduce the workload on the master node. In any event, it should be noted that because the super-VPN architecture introduced herein typically allocates and distributes membership management tasks among multiple master nodes, the overall workload for each master node to perform re-keying and/or translation for its assigned member nodes and encryption domains may be significantly reduced relative to what is required for traditional, single-master, single encryption domain simple-VPNs.

Even in the worst case, each master node in a preferred embodiment need only be responsible for re-keying its assigned member nodes; in contrast, in a traditional simple-VPN architecture, the single master node typically re-keys all members of its VPN whenever any member node leaves the group.

At step 450, it is determined whether the removal of the member node from the simple-VPN hosted by the assigned master node results in a "trivial" simple-VPN, i.e., one in which the assigned master node is the only surviving member. If so, then the surviving master node may cease to be a participant in the super-VPN, by recursively applying to the surviving master node the procedure for leaving described in connection with FIG. 4. In particular, if the surviving master node has one or more super-master nodes (i.e. master nodes to whom the surviving master node is a member in a simple-VPN, within the structure of the super-VPN), then the surviving master node preferably sends notification at step 400 to its super-master nodes that it wishes to leave the super-VPN, etc., with the entire process as described in connection with FIG. 4 being applied recursively. Said recursive application may eventually result in reducing the super-VPN to a trivial simple-VPN, in which case the super-VPN may cease to exist.

The use of multiple master nodes in a super-VPN in accordance with the teachings disclosed herein may thus increase the scalability of VPNs through distribution of encryption key management and other related tasks. Preferred super-VPN embodiments may similarly increase the reliability and efficiency of a VPN by enabling distribution and load balancing of other master node management tasks such as address management and validation of nonces. The latter (nonces) may be employed, for example, for purposes of the intrusion tolerance protocols disclosed In the PCT patent application entitled "Methods And Protocols For Intrusion-Tolerant Management Of Collaborative Network Groups, " Ser. No.

PCT/US01/13848, filed by the assignee of the present invention on even date with the present filing.

Failure Tolerance in Super-VPNs

In embodiments, fail-over mechanisms may be used to transparently re-route management tasks to an alternate master node in the case of a failure including failure of the current master node serving a given member node.

In a traditional VPN, failure of the single master node effectively disables the virtual secure communication channel among all of the individual member nodes of the VPN, and may therefore be considered a relatively catastrophic system failure. In the case of failure of a master node in a super-VPN, in contrast, what typically results is one or more super-VPN "islands", meaning the super-VPN graph has been split into two or more disjoint sub-graphs due to the failure of a connecting master node.

When a super-VPN island is created, there may be no global knowledge of the group membership of a super-VPN, and some additional procedures may thus be necessary in order to re-establish complete group communication. One contemplated mechanism for re-establishing super-VPN group communications after the creation of islands, for example, relies on the assignment of a backup master node at step 360 of the process shown in FIG. 3 for joining a super-VPN. At step 360, when a member node joins the super-VPN, the new node is preferably assigned and informed of a secondary (or "backup") master node that may be contacted by the member node in the case of failure of its primary master node. In this event, the backup master node may perform the procedure outlined in steps 320 et seq. of FIG. 3 with respect to each of the member nodes isolated on the "island" for which the backup master is now responsible. This provides a mechanism for "island" recovery that can tolerate at least one super-VPN master fault, subject to the time required for re-joining the super-VPN at the secondary master node.

An embodiment involving island recovery includes the master node of the island super-VPN re-initiating the process described earlier in connection with FIG. 3 for joining the super-VPN, however treating the island VPN as a new prospective member node. Similarly, skilled practitioners may recognize other suitable systems and methods for re-establishing VPN group communication with respect to "island" nodes created in the wake of a master node failure.

Master Node Participation in Multiple VPNS; Edge Networks

Figure 5:
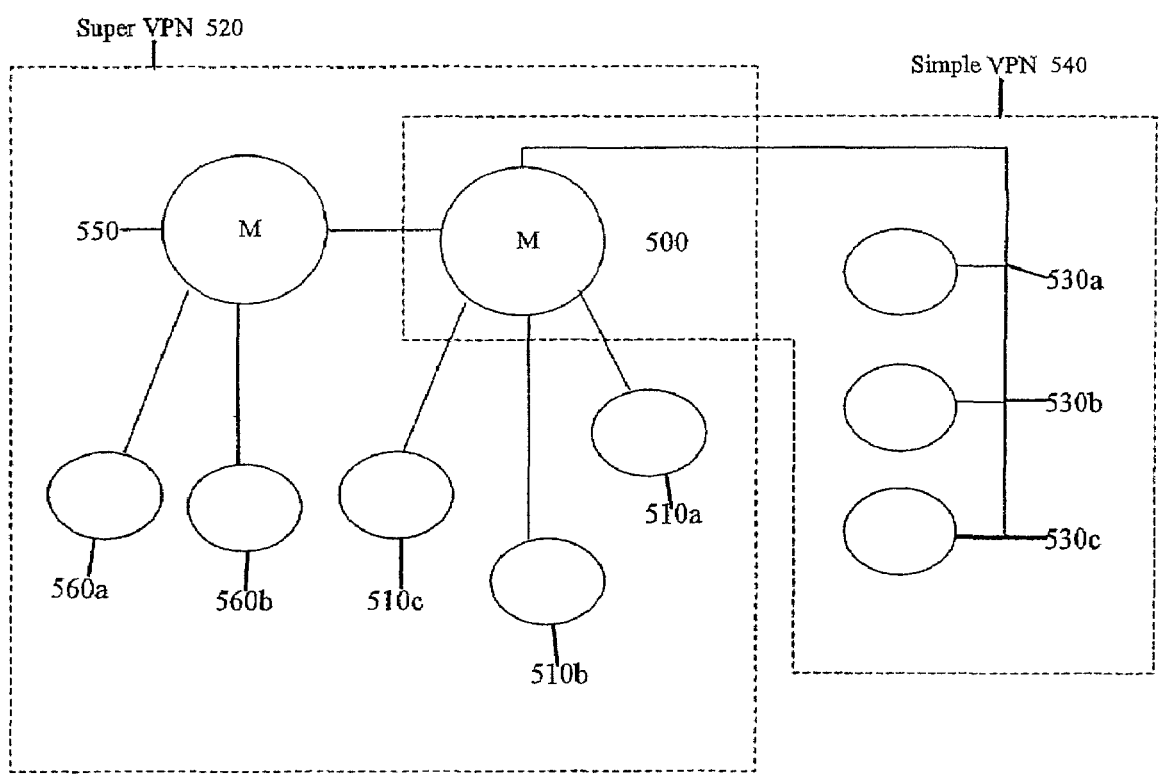
FIG. 5 schematically represents a system architecture in which group management responsibilities for a plurality of VPN groups are distributed and shared among multiple master nodes.

In a further aspect, as shown in FIG. 5, a given master node may have management responsibilities for two or more distinct super-VPNs and/or simple-VPNs. With reference to FIG. 5, master node 500 has responsibility for member nodes 510 a-c belonging to super-VPN 520, and master node 500 also has responsibility for members nodes 530 a-c belonging to simple-VPN 540. Super-VPN 520 may further include master node 550, with responsibility for member nodes 560 a-b. Although master node 500 often has responsibilities for both super-VPN 520 and simple-VPN 540, the two VPNs typically represent two distinct communication groups; i.e., private communications within super-VPN 520 are not available to simple-VPN 540, and vice versa. Membership and key management within simple-VPN 540 generally proceeds in the traditional manner, while membership and key management within super-VPN 520 are preferably handled in a distributed manner by master nodes 500 and 550 using the methods described earlier herein in connection with FIGS. 3 and 4.

Master nodes 500 and 550 in FIG. 5, for example, may be advantageously implemented and deployed as servers that are part of an edge-based content delivery network. Edge-based content delivery networks may be deployed to improve the speed, throughput, and so on of traffic flow through the Internet by using techniques such as the replication and caching of content (especially relatively static content) at so-called "edge" servers located around topological edges of the Internet. For example, when a client requests particular data content from a network source, this approach may automatically forward or re-route the client's request to an edge server where that content has previously been replicated or cached and that is positioned relatively close to the requesting client (or otherwise determined to have a good quality of connectivity with that client). The desired content is then preferably served to the client from that point, instead of having to traverse the interior "cloud" of the Internet all the way from an original, central server. Preferably the edge server is selected at least partly on the basis of performance criteria including best/closest connection to the requesting client. For example, selection criteria may preferably include connectivity estimates/metrics between the selected edge server and client system such as: geographical distance, topological distance, bandwidth, latency, jitter, financial costs (e.g. fees associated with any necessary traversals of commercial network backbone crossing points), and national/political boundaries that would be traversed. Note that edge-based content delivery network technology is known to skilled practitioners in the art, and has been widely commercialized by companies including Digital Island and Akamai. For more details see, for example, www.digisle.net, www.akamai.com; and U.S. Pat. No. 6,185,598 entitled "Optimized Network Resource Location."

Due to the frequent proximity of edge network nodes to corresponding client nodes, implementing VPN master nodes as the servers of an edge network often provides more reliable connectivity between master nodes and member (client) nodes, usually at higher speed, with lower latency and jitter and may allow for a broader geographic distribution of the master nodes. These benefits are potentially available even in embodiments where the master nodes do not necessarily each manage multiple VPNs, as they do in the embodiment of FIG. 5. However, the embodiment of FIG. 5 may further facilitate a business strategy whereby a managed network of server nodes, such as the edge-based servers of a content delivery network, can be exploited to provide services such as commercial hosting and management for relatively numerous concurrent simple and/or super-VPNs. The architecture shown in FIG. 5 may provide increased utilization and returns especially when employed for a given network of edge servers.

Super-VPN Graphs

It is contemplated that a member node of a first super-VPN may be the master node of one or more other super-VPNs or simple-VPNs. More generally, network configurations of arbitrary complexity may readily be implemented.

Figure 6:
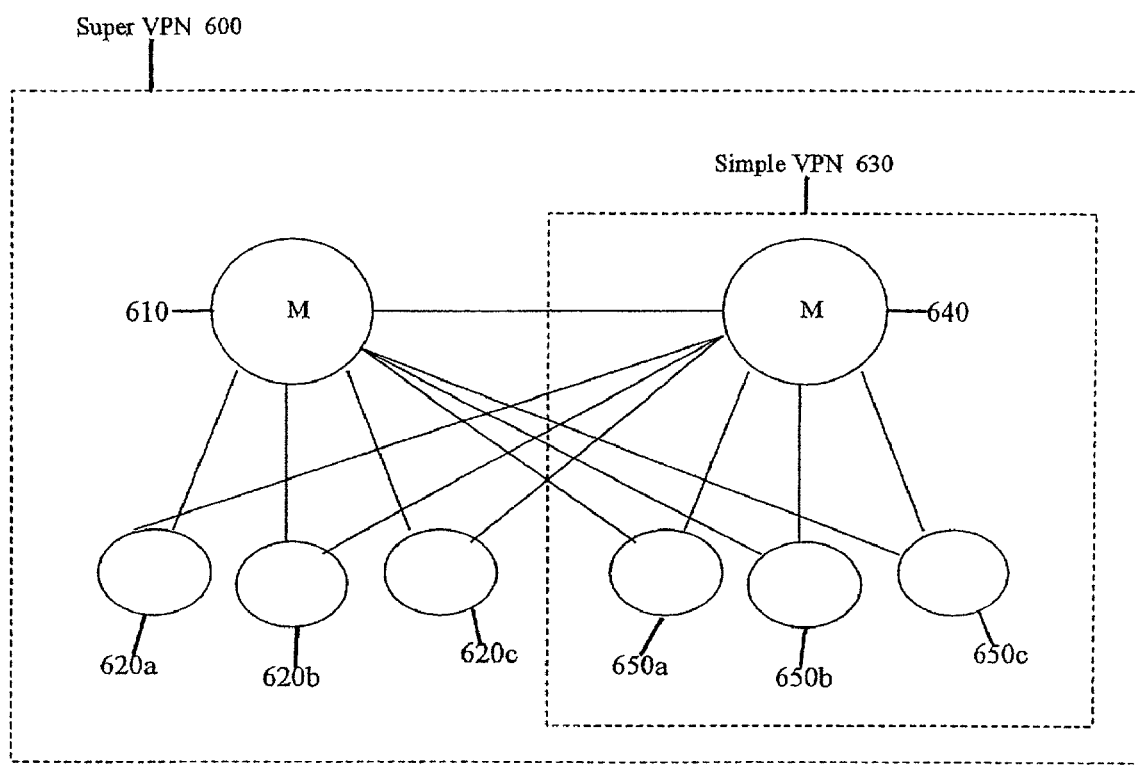
FIG. 6 schematically represents a multi-master VPN having a complex graph structure.

The earlier described FIG. 2 showed a super-VPN hierarchy of two master nodes. FIG. 6 further shows a super-VPN graph 600 containing the same number of nodes as FIG. 2, but exemplifying how more complex arrangements of nodes may be constructed. In general, graph structures of arbitrary complexity may be designed and deployed by practitioners, as appropriate to various applications. Earlier, we described herein how the hierarchical structure of FIG. 2 allowed for the delegation of management burden from master node 210 to master node 240. In embodiments with more complex graph structures such as shown in FIG. 6, several aspects of reliability may be added to the super-VPN, as will now be discussed.

A difference between the super-VPN 200 of FIG. 2 and the super-VPN 600 of FIG. 6 is topology: super-VPN 600 provides multiple paths between any two member nodes, in contrast to the single path between any two nodes of super-VPN 200. For example, a first path between member node 650 *a* and member node 620 *a* passes through both master nodes 640 and 610, while a second path proceeds simply through master node 610. Similarly, member nodes 650 *a* and 650 *b* are connected by three paths: one path proceeding through master 640, a second path through master 610, and a third path through both of the master nodes. In general, having N paths (where N>1) between two nodes enables the system to provide greater assurance that the group communications will reach every member node of the super-VPN, as the super-VPN can therefore tolerate the failure of N−1 paths between the two nodes. In addition to the fault-tolerance often exemplified by multiple paths between two nodes, a cyclic graph topology may provide a level of intrusion-detection in a super-VPN, i.e., detecting when a node in the super-VPN is not correctly forwarding messages but instead is modifying the content in some way prior to forwarding. The level of intrusion-detection may be achieved by comparing group communications that arrive at any given node having followed diverse paths from the communication's source node. A security advantage may be derived at the cost of relatively more network traffic being passed around overall (through the different paths), however, presenting a cost-benefit tradeoff for practitioners who may elect different decision choices for different applications.

Further contemplated super-VPN embodiments may utilize "peer-to-peer" networks. In contrast with a managed "edge network" deployment strategy, a characteristic feature generally is that no single authority has control over the nodes in the peer-to-peer network. Such deployments do not require any centrally managed build-up of infrastructure, and instead rely on "grass-roots" efforts to bootstrap the network infrastructure. Current examples of peer-to-peer networks include file/resource-sharing services like GNUtella. Embodiments are contemplated wherein master and member nodes of the super-VPN belong to a peer-to-peer network; essentially, a viral model of VPN deployment is adopted. Because the infrastructure nodes in peer-to-peer embodiments are typically unmanaged, in general there is no trust between any two nodes in the network. This may not be of paramount concern in some overlay applications; however, in the case of VPN services that require strict authentication and encryption, utilizing a viral peer-to-peer deployment may require extra security safeguards. Thus in peer-to-peer embodiments, the fault tolerance and intrusion-detection features described in connection with FIG. 6 may be especially beneficial.

Further Embodiments

Thus, specific embodiments and applications of groupware related methods and devices have been disclosed. It should be apparent, however, to those skilled in the art that many more modifications besides those described are possible without departing from the inventive concepts herein. For example, in a preferred embodiment, the master nodes control membership to a VPN, but it is contemplated that membership may be to a virtual overlay other than a VPN. For example, a master node may be controlling membership to a non-encrypted collaborative group communication or a multi-player game instead of a VPN. Such alternative applications may take advantage of the teachings herein for distributed and fault-tolerant group management (possibly still including the use of authentication of prospective member nodes) without the use of encrypted communications, and hence without the master nodes having to perform key management for the overlay network.

The inventive subject matter, therefore, is not to be restricted except in the spirit of the following claims.

What is claimed is:

1. A group management system comprising:
   a plurality of interconnected nodes communicatively coupled with each other as member nodes of a virtual private network ("VPN"), wherein all communications between said interconnected nodes are encrypted by said interconnected nodes; and
   a plurality of master nodes, different from the plurality of interconnected nodes, each of the master nodes controlling admission and departure in the VPN for an associated non-empty subset of the member nodes and further facilitating said communications between said plurality of interconnected nodes, wherein in the event one of the master nodes fails, the associated subset of member nodes will be automatically reassigned to one or more other of the master nodes,
   wherein a membership change in at least one of the subsets is performed without notifying all of the master nodes not associated with the changed subset.

2. The system of claim 1, wherein at least two of the subsets do not share any member nodes in common.

3. The system of claim 1, wherein at least two of the subsets share at least one member node in common.

4. The system of claim 3, wherein a communication involving said common member node can be transmitted along multiple paths.

5. The system of claim 4, further comprising an intrusion detection mechanism that receives said multiple-path communication as input.

6. The system of claim 1, wherein each of the member nodes is associated with at least one of the master nodes as a back-up master.

7. The system of claim 1, wherein the plurality of interconnected nodes is communicatively coupled as part of a peer-to-peer network.

8. The system of claim 1, wherein the plurality of master nodes is part of an edge-based content delivery network.

9. The system of claim 1, wherein the member nodes are allocated to the subsets at least partly based upon one or more criteria of connectivity between each of the member nodes and the corresponding master nodes.

10. The system of claim 9, wherein the connectivity criteria are selected from a group of criteria comprising geographical distance, topological distance, bandwidth, latency, jitter, financial cost, and political boundaries.

11. The system of claim 1, wherein at least one of the master nodes further controls membership in another virtual overlay group different from the VPN.

12. The system of claim 1, wherein a communication from a first one of the subsets of the member nodes uses a first encryption key, and a communication from a second one of the subsets uses a second encryption key that is different from the first encryption key.

13. The system of claim 12, wherein one or more of the master nodes are operable to translate between encryption keys.

14. The system of claim 1, wherein a communication from a first one of the subsets of the member nodes and a communication from a second one of the subsets of the member nodes both use the same encryption key.

15. The system of claim 1, wherein at least one of the master nodes is operable to remotely install software communication mechanisms for a new member node of the VPN without the necessity of installing augmented hardware for the new member node.

16. A method for managing a group, the method comprising:
   providing a plurality of interconnected nodes communicatively coupled with each other as member nodes of a virtual private network ("VPN"), wherein all communications between said interconnected nodes are encrypted by said interconnected nodes; and
   providing a plurality of master nodes, different from the plurality of interconnected nodes, each of the master nodes controlling admission and departure in the VPN for an associated non-empty subset of the member nodes and further facilitating said communications between said plurality of interconnected nodes, wherein in the event one of the master nodes fails, the associated subset of member nodes will be automatically reassigned to one or more other of the master nodes,
   wherein a membership change in at least one of the subsets is performed without notifying all of the master nodes not associated with the changed subset.

17. The method of claim 16, wherein at least two of the subsets do not share any member nodes in common.

18. The method of claim 16, wherein at least two of the subsets share at least one member node in common.

19. The method of claim 18, wherein a communication involving said common member node can be transmitted along multiple paths.

20. The method of claim 19, further comprising an intrusion detection mechanism that receives said multiple-path communication as input.

21. The method of claim 16, wherein each of the member nodes is associated with at least one of the master nodes as a back-up master.

22. The method of claim 16, wherein the plurality of interconnected nodes is communicatively coupled as part of a peer-to-peer network.

23. The method of claim 16, wherein the plurality of master nodes is part of an edge-based content delivery network.

24. The method of claim 16, wherein the member nodes are allocated to the subsets at least partly based upon one or more criteria of connectivity between each of the member nodes and the corresponding master nodes.

25. The method of claim 24, wherein the connectivity criteria are selected from a group of criteria comprising geographical distance, topological distance, bandwidth, latency, jitter, financial cost, and political boundaries.

26. The method of claim 16, wherein at least one of the master nodes further controls membership in another virtual overlay group different from the VPN.

27. The method of claim 16, wherein a communication from a first one of the subsets of the member nodes uses a first encryption key, and a communication from a second one of the subsets uses a second encryption key that is different from the first encryption key.

28. The method of claim 27, wherein one or more of the master nodes are operable to translate between encryption keys.

29. The method of claim 16, wherein a communication from a first one of the subsets of the member nodes and a communication from a second one of the subsets of the member nodes both use the same encryption key.

30. The method of claim 16, wherein at least one of the master nodes is operable to remotely install software communication mechanisms for a new member node of the VPN without the necessity of installing augmented hardware for the new member node.

* * * * *